No. 636,496. Patented Nov. 7, 1899.
N. G. DEATON.
COLLAR STUFFING MACHINE.
(Application filed Mar. 9, 1899.)
(No Model.)
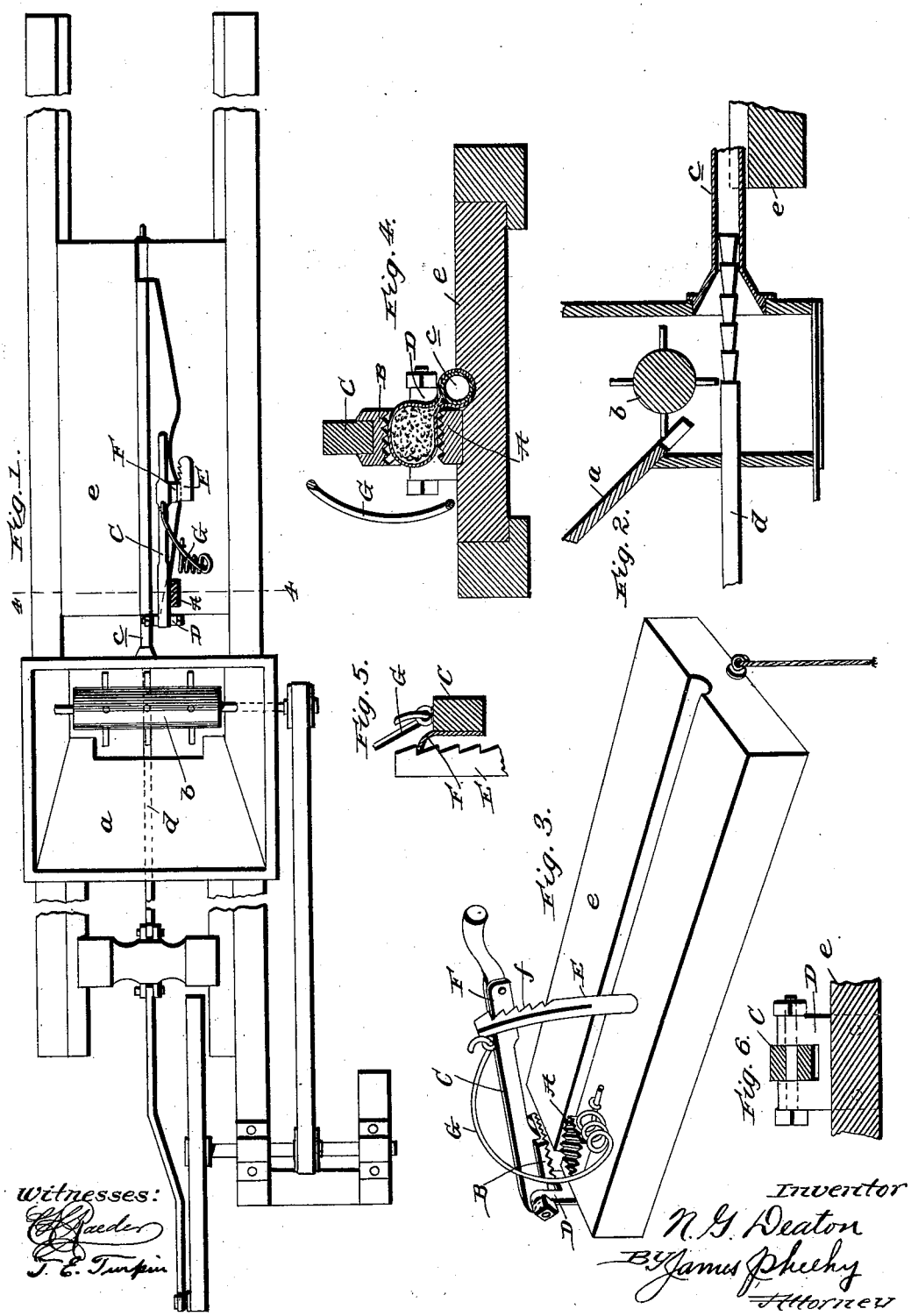
Witnesses:
Inventor
N. G. Deaton
By James Sheehy
Attorney

UNITED STATES PATENT OFFICE.

NOAH G. DEATON, OF BUFORD, GEORGIA.

COLLAR-STUFFING MACHINE.

SPECIFICATION forming part of Letters Patent No. 636,496, dated November 7, 1899.

Application filed March 9, 1899. Serial No. 708,379. (No model.)

*To all whom it may concern:*

Be it known that I, NOAH G. DEATON, a citizen of the United States, residing at Buford, in the county of Gwinnett and State of Georgia, have invented new and useful Improvements in Collar-Stuffing Machines, of which the following is a specification.

My invention relates to machines for stuffing horse-collars with straw or other material, and contemplates the provision of an improved fastener for holding a collar incident to the stuffing thereof, the said fastener being cheap and simple, susceptible of ready application to various kinds of horse-collar-stuffing machines, and adapted to be quickly and easily operated to fasten a collar and also adapted to securely hold the collar against casual release during the stuffing thereof.

With the foregoing in view the invention will be fully understood from the following description and claim when taken in conjunction with the annexed drawings, in which—

Figure 1 is a plan view of so much of a collar-stuffing machine as is necessary to illustrate the application of my improved fastener. Fig. 2 is a detail section of the machine. Fig. 3 is an enlarged perspective view of the carriage of the machine with my improved fastener thereon. Fig. 4 is an enlarged detail section taken in the plane indicated by the line 4 4 of Fig. 1. Fig. 5 is a detail section illustrative of the manner in which the lever of the fastener is adjustably fixed. Fig. 6 is a similar view illustrative of the manner in which the lever is connected with the carriage.

In the said drawings similar letters designate corresponding parts in all of the views.

The machine illustrated, in common with many others, embraces a hopper $a$ for the reception of cut straw or other filling material, a feed-wheel $b$ in said hopper, a delivery-tube $c$ projecting horizontally from the hopper, a reciprocatory plunger $d$ working within said tube, suitable mechanism for actuating the feed-wheel and the plunger, and a sliding carriage $e$ on which the collar to be stuffed is to be placed, the said carriage being provided with a counterbalance-weight and cord connection (not shown) for offering constant resistance to the pressure of the packing-plunger and enabling the collar to retreat as it is packed and also for restoring the carriage to its original position when a stuffed collar is removed.

My improved fastener is designed more particularly for holding a collar while the rim thereof is being stuffed and I have so illustrated it. It is carried by the sliding carriage $e$ of the machine in a position to hold the rim of the collar on the delivery-tube $c$, and comprises a fixed clamping member A, connected to the upper side of the carriage $e$ and having a ribbed or serrated face, and a movable clamping member B, also having a ribbed or serrated face. The said movable member B is carried by a lever C, fulcrumed on a standard D, rising from the carriage $e$, and is designed to be pressed by said lever against the stuffed belly of a collar interposed between it and the fixed member A after the manner shown in Fig. 4.

For the purpose of securely holding the lever C when it is pressed down, as mentioned, I provide the rack E, connected to the carriage $e$ and having the beveled teeth $f$, and the dog F, connected to the lever and arranged to ride over the teeth $f$ on the down movement of the lever and engage said teeth and prevent casual upward movement of said lever. The lever C when released from the teeth of the rack E is assisted in its upward movement by a bowed spring G, which is connected to said lever and to the carriage $e$ after the manner best shown in Fig. 3. This spring G also serves by exerting a constant upward pull on the lever to hold the dog F in engagement with the teeth of the rack E, and thereby effectually prevents the casual release of the lever when the fastener is in operation. This will be appreciated as an important advantage when it is remembered that the casual release of horse-collars while being stuffed not only occasions considerable loss of time, but is frequently attended by serious damage to both the collar and the stuffing machinery.

My improved fastener is carried by the carriage $e$ of the machine, as stated, and when the rim of a collar is to be stuffed said rim is placed over the mouth of the delivery-tube $c$ and the stuffed belly of the collar is interposed between the clamping members A B, after which the lever C is depressed and its dog F placed in engagement with a tooth of the rack E, as shown in Fig. 5. The fastener may be quickly and easily manipulated in the manner described, and when so manipulated it serves to securely hold the collar and there is absolutely no liability of the collar being casually released during the stuffing thereof. When, however, it is desired to release the collar, the same may be effected by simply moving the lever laterally to disengage its dog from the rack, when the spring G will throw the lever upwardly.

It will be appreciated from the foregoing that because of the facility with which a collar may be secured and released when my improved fastener is employed the said fastener is calculated to increase the capacity of any machine to which it is applied, which is an important advantage.

Having thus described my invention, what I claim is—

In a collar-stuffing machine, the combination of a carriage, a lower, fixed clamping member arranged on the carriage and having an upper roughened face, a rack connected to and rising from the carriage and having beveled teeth, a lever fulcrumed on the carriage and carrying a dog arranged to engage the teeth of the rack, an upper clamping member carried by the lever and having a lower roughened face, and a bowed spring connected to the carriage and to the lever, substantially as specified.

In testimony whereof I have hereunto set my hand in presence of two subscribing witnesses.

NOAH G. DEATON.

Witnesses:
L. R. MARTIN,
C. L. BURTON.